Jan. 7, 1930.                G. A. ZEUMER                1,742,745
                DEVICE FOR REMOVING BRISTLES FROM FURS
                         Filed Aug. 1, 1928
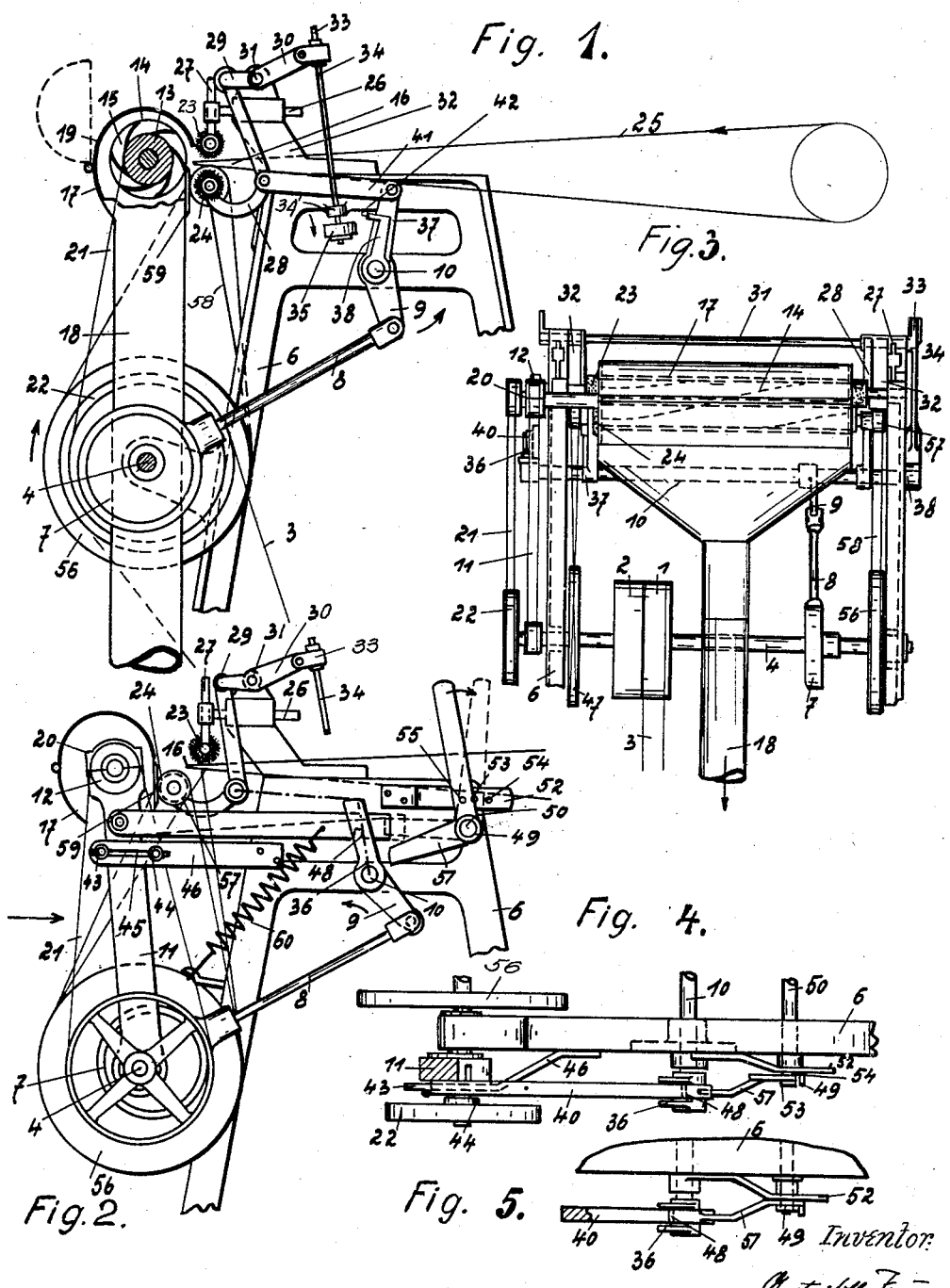

Patented Jan. 7, 1930

1,742,745

UNITED STATES PATENT OFFICE

GUSTAV ARTHUR ZEUMER, OF MARKRANSTADT, GERMANY

DEVICE FOR REMOVING BRISTLES FROM FURS

Application filed August 1, 1928, Serial No. 296,830, and in France and Belgium March 5, 1928.

For the removal of bristles from furs, it is usual to pass the furs by means of an endlass apron across the pointed edge of a wedge-shaped support, the soft hair being parted at the edge by means of brush rollers which allow the stiff hairs to spring out so that they can be removed by means of cutters. In a known machine serving the above purpose guillotine cutters are employed, and an elongated suction nozzle is arranged behind the cutters opposite the fur supporting edge so as to draw the bristles away from the latter while the cutters are operated the object of this arrangement being to prevent bent and curly hairs from escaping the cutters.

The present invention relates to a machine of this kind and its object is to effect certain improvements with a view to permit the employment of a revolving cutter adapted to recede from the fur while the latter is being transported, and the invention consists in the provision of a pivoted suction pipe having an enlarged head within which the revolving cutter is so arranged as to co-operate with a straight rigid cutter forming one edge of the suction nozzle, means being provided for rocking the pipe so that the suction head and cutters will be retracted from the fur support while the fur is advanced and then approached to the same for severing the bristles.

The rocking movement of the pipe is preferably produced by means of an eccentric and a lever system which acts on bars arranged so as to engage the cutter shaft and so as to rock together with the pipe.

Fig. 1 of the accompanying drawings represents a sectional view of the machine,

Fig. 2, a side elevation of the same,

Fig. 3, a front view, and

Figs. 4 and 5 are top views of constructional details.

The furs are connected to an endless travelling apron 25 which is moved across the pointed edge of a wedge-shaped support 16. Brush rollers 23 and 24 are arranged at opposite sides of the support so as to sweep the fur and part the hairs at the edge of the support. Only the soft hairs yield to the brushes; the stiff hairs spring out as they pass the edge of the support 16, and they can then be severed from the fur by a pair of cutters. To maintain bent and curly hairs in position to be severed by the cutters, a suction nozzle is arranged in front of and normally close to the edge of the support 16. According to the invention the nozzle is formed on the enlarged, hopper-shaped head 17 of the suction pipe 18 which is rockingly supported on a shaft 4. The lower edge of the suction nozzle is formed by a straight rigid cutter 59, and the upper edge by a hinged bonnet 19 which constitutes the upper part of the suction head. Within the suction head a revolving cutter 14 is arranged which is composed of a roller 13 on which helical cutter blades 15 are mounted in position to co-operate with the cutter 59. The cutter shaft is supported in bearings 12 connected to the side walls of the suction head and carries a pulley 20 whereby it receives motion through the medium of a belt 21 from a pulley 22 mounted on the shaft 4. The latter is supported in bearings on the machine frame 6 and receives its motion from the main shaft of the machine through the medium of a belt 3 which can be shifted on to either of two pulleys 1 and 2 one of which is loose and the other fast.

Suction head and cuttters are controlled by two bars 11 which engage the bearings of the shaft 4 as well as of the cutter shaft and which are adapted to rock about the shaft 4. Rods 40, which are pivoted to the bars 11, are supported at their free ends on driving pins 48 held in forked arms 36 mounted on a rock shaft 10. The rods are notched for engagement with the driving pins and are maintained in engagement with the latter by springs 60 which also tend, when the rods are disengaged from the pins 48, to retract the suction head and cutters from the fur support 16. The shaft 10 is rocked by an eccentric 7 which is mounted on the shaft 4 and which is connected by a rod 8 to an arm 9 on the rock shaft. Normally the rocking movements of the shaft 10 are transmitted by means of the rod 40 to the suction pipe the head of which is approached to the fur while the latter is stationary for severing the bristles and then retracted so as to allow the fur to be fed forwards.

To allow the suction head to be maintained in retracted position, for instance when a readjustment of the fur is required, a hand lever 49 is provided whereby a shaft 50 can be rocked. Arms 51 on the shaft 50 are adapted to engage under the ends of the rods 40, when the hand lever is turned in the direction of the arrow, so as to disengage the rods from the driving pins 49 and cause the forks 36 to move idly under the rods. To maintain the hand lever in operated position a spring 52 is provided which carries a pin 53 adapted to snap into an aperture 55 in the hand lever. Another pin 54 on the spring limits the movement of the hand lever in case the pin 53 should fail to enter the aperture.

The rocking movements of the suction pipe are limited by resilient stops 43 and 44 which are adjustable along a slot in an arm 46 which is rigidly secured to the machine frame.

The upper brush roller 23 is carried by vertical arms 27 which are adjustably held in sockets carried by horizontal arms 26, the latter being adjustable in brackets 32 on the machine frame. The lower roller 24 is adapted to follow the movements of the suction head and is for this purpose mounted in J-shaped links 28 which depend from lever arms 29 mounted on a shaft 31. The links are connected by rods 41 to arms 37 on the rock shaft 10. Since these arms move in the same direction as the arms 36 which operate the suction head, the roller 24 will receive a horizontal reciprocating movement equal to that of the suction head. The roller 24 is also subjected to a vertical reciprocation for which purpose the shaft 31 is rocked through the medium of an arm 30 which is secured to the shaft and jointed to a member 33 wherein a rod 34 is adjustably held by means of a screw-thread and nuts. The lower end of the rod 34 is arranged to slide in a guide 34¹ connected to the machine frame and carries an adjustable collar 35. In following the retracting movement of the suction head, the roller 24 first moves about the suspension point of the links 28. Towards the end of the movement and after the fur has been advanced, the collar 35 is engaged by a lug 42 on an arm 38, mounted on the shaft 10, and depressed by said lug so as to rock the shaft 31. The roller 24 will then be raised in front of the tip of the wedge 16 so as to part the hairs over the latter. The pressure with which the roller 24 bears against the fur can be regulated by an adjustment of the rod 34 relative to the members 33 and 35.

The roller 23 receives motion through the medium of a crossed belt from a pulley 47 on the driving shaft 4. The roller 24 receives motion through the medium of an open belt 58 from a pulley 56 on the same shaft.

I claim:

1. A machine for removing bristles from furs, comprising a wedge-shaped fur support, a pair of brush rollers arranged at opposite side of the pointed edge of said support for parting the hair of the fur along said edge, a pivoted suction pipe having an enlarged head and a suction nozzle in said head extending along and on a level with the pointed edge of the fur support so as to attract the bristles from the fur, a straight rigid cutter forming the lower edge of said nozzle, a revolving cutter arranged inside the head so as to cooperate with said straight cutter for cutting the projecting bristles, and means for rocking the pipe so as to approach the suction head and cutter to the fur for cutting the bristles and then retracting the same to allow the fur to be fed forwards.

2. A machine as claimed in claim 1 wherein the means for rocking the suction pipe comprises a rock shaft, a pair of arms on said rock shaft, a pair of pivoted bars connected to and adapted to rock together with the pipe, and rods connecting the bars with the arms on the rock shaft.

3. A machine as claimed in claim 1 wherein the means for rocking the suction pipe comprises a rock shaft, a pair of arms on said rock shaft, pins on said arms, a pair of pivoted bars connected to and adapted to rock together with the pipe, a pair of rods pivoted to said bars and provided with notches adapted to engage said pins, and springs connected to said rods and to rigid supports, said springs tending to hold the rods in engagement with the pins and also to pull the rods so as to retract the suction head from the fur support.

4. A machine as claimed in claim 1 wherein the means for rocking the suction pipe comprises a rock shaft, a pair of arms on said rock shaft, pins on said arms, a pair of pivoted bars connected to and adapted to rock together with the pipe, a pair of rods pivoted to said bar and provided with notches wherewith to engage said pins, springs connected to said rods and to rigid supports, said springs tending to hold the rods in engagement with the pins and also to pull the rods so as to retract the suction head from the fur support, a hand lever for releasing the rods from the pins, and means for fixing the hand lever in a position wherein it prevents the rods from re-engaging the pins.

5. A machine as claimed in claim 1 in combination with adjustable stops for limiting the rocking movements of the suction pipe.

GUSTAV ARTHUR ZEUMER.